July 21, 1959  F. L. HALLARD  2,895,476
COLOSTOMY BELTS AND THE LIKE
Filed Dec. 13, 1957  2 Sheets-Sheet 1
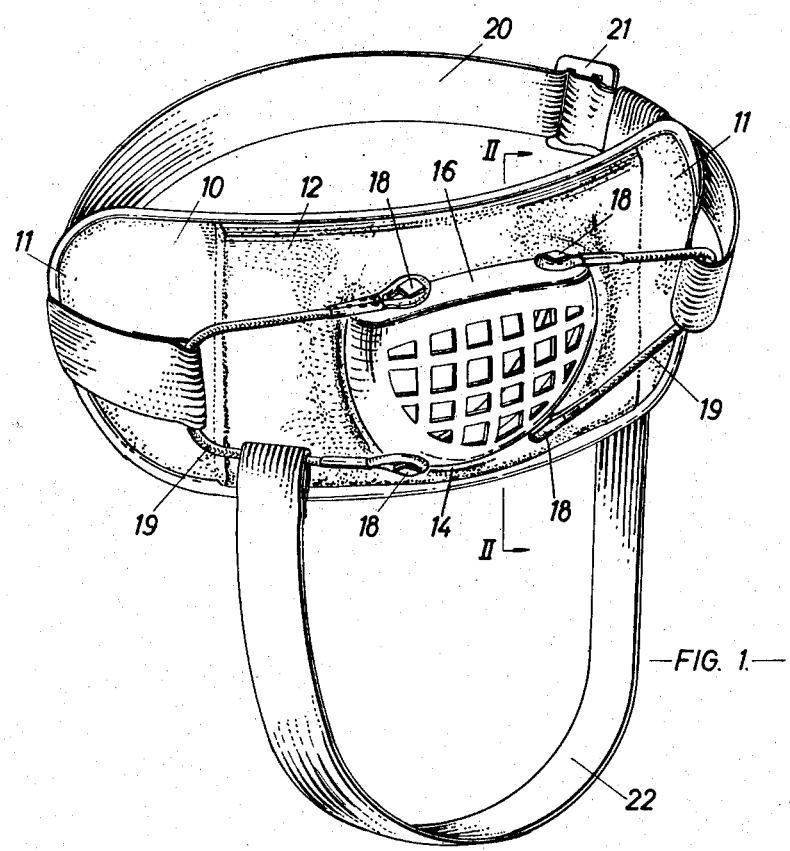
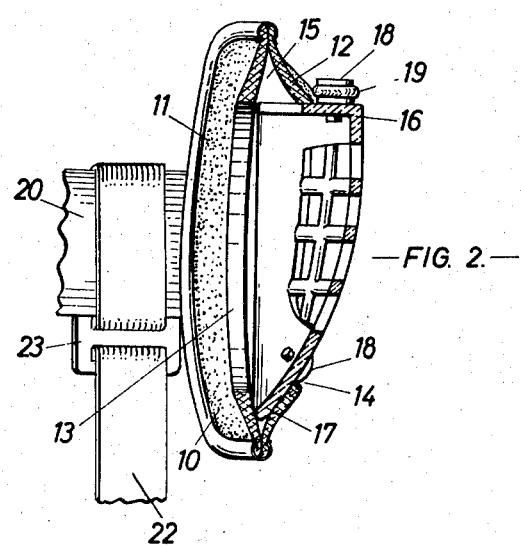
INVENTOR
Frank Leslie Hallard
BY
ATTORNEY July 21, 1959  F. L. HALLARD  2,895,476
COLOSTOMY BELTS AND THE LIKE
Filed Dec. 13, 1957  2 Sheets-Sheet 2
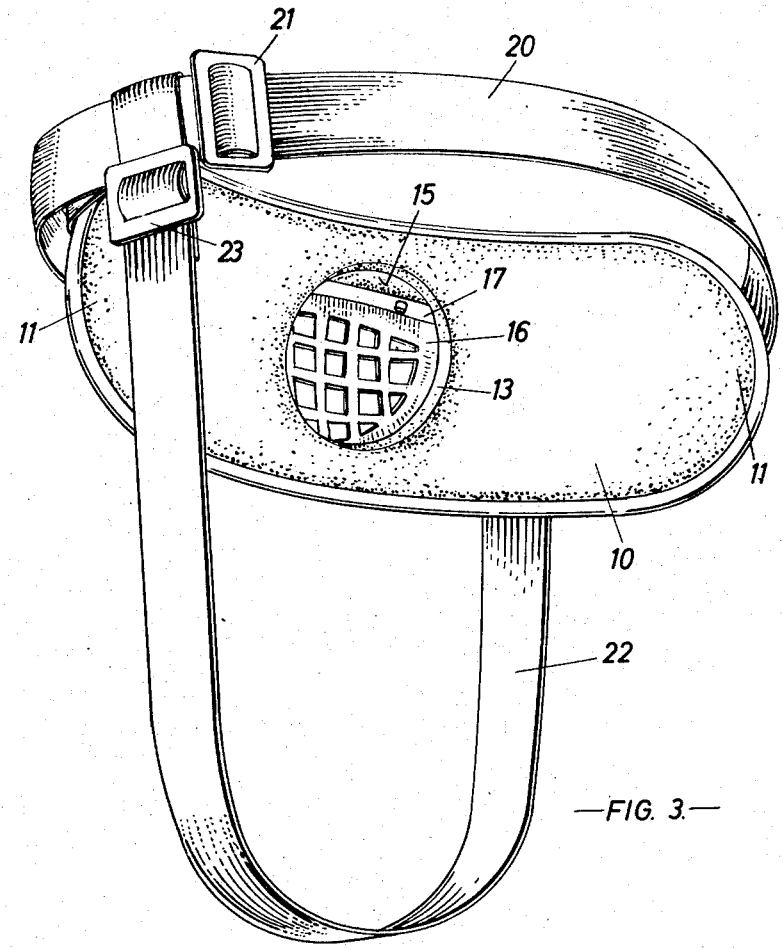
—FIG. 3.—
INVENTOR
Frank Leslie Hallard
BY
ATTORNEY

United States Patent Office 2,895,476
Patented July 21, 1959

2,895,476

COLOSTOMY BELTS AND THE LIKE

Frank Leslie Hallard, Manchester, England

Application December 13, 1957, Serial No. 702,586

Claims priority, application Great Britain
January 22, 1957

3 Claims. (Cl. 128—283)

The present invention relates to colostomy belts and the like.

Such belts are known and generally comprise a broad band of webbing adapted to be positioned tightly about the abdomen and to support an absorbent dressing, pad or the like in register with the body cavity.

As they are likely to become soiled, the belts are usually made of a washable rubberized fabric which is inelastic and which therefore, does not allow circulation of air. Thus, the belts encourage the accumulation of perspiration, with detrimental results, since this acts as an irritant at the body cavity.

Furthermore, it is usual to provide metal ribs or the like, somewhat resembling corset bones, in the belts and accordingly they are uncomfortable to wear.

It is an object of the present invention to provide a novel construction of belt wherein the aforementioned disadvantages are eliminated; which is light and comfortable to wear; and which will still fulfill the requirements of the prior known belts.

It is another object of the present invention to provide a colostomy or like belt which comprises a pad of light foamed plastic material having a central aperture which serves to receive a removable perforate element for holding an absorbent dressing or the like, there being a harness or other suitable means permitting the pad to be worn with the perforate element in register with a body cavity.

As applied to a colostomy belt, the pad of foamed plastic material is preferably elongated such that, when the belt is in position, part thereof will extend over, and shield the associated operation wound.

Preferably the pad of foamed plastic is thicker in the region of the aperture, and the aperture is undercut so that the edges of the perforate element are, for the most part, disposed within the thickness of the pad; and such thickening may be provided by an additional piece of foamed plastic suitably bonded to the pad.

The perforate element may conveniently be substantially semi-circular and dished in shape, the aperture in the pad of foamed plastic which faces the element being somewhat smaller than the element.

The harness may, if desired, be inextensible. Preferably, however, it is made of elasticated webbing having loops at the ends thereof similar to braces loops, these fitting onto suitable button-like projections provided on the perforate element.

With these and other objects in view which will become apparent in the following detailed description, the present invention will be clearly understood in connection with the accompanying drawings, in which:

Figure 1 is a front perspective view of a colostomy belt constructed in accordance with the present invention;

Fig. 2 is a cross-section corresponding to line II—II of Fig. 1; and

Fig. 3 is a rear perspective view of the belt.

Referring now to the drawings, the belt comprises an elongated pad 10, which is arcuate at its ends 11, of foamed plastic material such as foamed polyurethane, which is thickened by bonding thereto a second, substantially square piece 12 of the foamed plastic about midway between the arcuate ends 11 of the pad 10.

An aperture 13 of comparatively small diameter is provided in the pad 10, and in correspondence therewith in the square piece 12 is a slightly larger aperture 14 (Fig. 1), a marginal portion of the square piece 12 surrounding the larger aperture 14 being left unbonded to the pad 10, so that it provides, effectively, an under cut slot 15 between the pad 10 and the square piece 12 of foamed plastic (see Fig. 2).

Into the larger aperture 14 there fits a roughly semi-circular shallow dish-like perforate element 16 of moulded plastic, the edges 17 thereof for the most part bearing against the rectangular pad 10, and being contained between such pad 10 and the square piece 12 of foamed plastic, so that they are not exposed.

This dish-like element 16 has, on its convex surface, four button-like projections 18 and these serve in pairs to receive loops 19 of a webbing harness, the loops 19 being similar to braces loops.

The harness comprises a waist belt 20 of narrow elasticated webbing, provided with an adjuster 21, the ends of which waist belt 20 connect one to each of the loops 19 on the dish-like element 16; and a crutch belt 22 which extends from one of the loops 19 aforesaid (see Fig. 1) to connect to the waist-belt 20 at a point remote from the pad 10, and which is also adjustable by means of an adjuster 23.

In use, the device is positioned (with a suitable absorbent or like pad or dressing disposed in the dish-like element 16) so as to cover the body cavity, with the pad 10 extending approximately horizontally at each side thereof, part of the pad 10 extending over and suitably shielding the associated operation wound.

The waist and crutch belts 20, 22 are then connected, in suitable adjustment, to hold the pad 10 and dish-like element 16 in position.

Because the harness acts through the dish-like element 16, the edges 17 of which are disposed within the combined thickness of the foamed plastic pad 10 and square piece 12, no uncomfortable pressure results therefrom, and rubbing and chafing are avoided.

Further advantages of the belt according to the present invention are that it is very light and is completely comfortable in wear, it can readily be adjusted and consequently individual "tailoring" of belts (as is now necessary) is eliminated, the pad with the dish-like element 16 can be moved away from the body while the belt is in wear, to permit replacement of an absorbent or like pad or dressing; it allows circulation of air to the body cavity so that accumulation of perspiration is avoided; and it is cheap to manufacture. Moreover, it is more hygienic than prior known belts in that the plastic pad and the dish-like element can be washed thoroughly and quickly, the dish-like element being readily removable for this purpose.

The invention, of course, is not confined to colostomy belts, and can be applied, with advantage, to similar belts the purpose of which is to apply an absorbent or like pad or dressing to a cavity or other part of the body.

While I have disclosed one embodiment of the present invention, it is to be understood that this embodiment is given by example only and not in a limiting sense, the scope of the present invention being determined by the objects and the claims.

I claim:

1. A surgical belt comprising an elongated pad of light foamed plastic material having an additional piece of foamed plastic material bonded thereto so as to provide a thickened portion at the center of said pad, said pad having an aperture, said additional piece having a second larger aperture, said apertures together providing an under cut recess in said pad, a removable perforate element, absorbent pads received in said perforate element, the latter being disposed in said under cut recess, and harness means connected with said perforate element and permitting said belt to be worn with said perforate element in register with a body cavity.

2. A surgical belt comprising an elongated pad of light foamed plastic material having an additional piece of foamed plastic material bonded thereto so as to provide said pad with a thickened region, said pad having an aperture, said additional piece having a second larger aperture, said apertures together providing an under cut recess in said pad, a removable perforate semi-circular dished element, absorbent pads received in said perforate element, the latter being disposed in said under cut recess, and harness means connected with said perforate element and permitting said belt to be worn with said perforate element in register with a body cavity.

3. A colostomy belt comprising an elongated pad of light foamed plastic material having an additional piece of foamed plastic material bonded thereto so as to provide a thickened portion at the center of said pad, said pad having an aperture, said additional piece having a second larger aperture, said apertures together providing an under cut recess in said pad, a removable perforate element, absorbent pads received in said perforate element, the latter being disposed in said under cut recess, said removable perforate element having button-like projections and harness means connected to said projections and permitting the belt to be worn with said perforate element in register with a body cavity.

References Cited in the file of this patent

UNITED STATES PATENTS

| | | |
|---|---|---|
| 2,593,211 | Smith | Apr. 15, 1952 |
| 2,679,248 | Fullaway | May 25, 1954 |
| 2,688,327 | Berg | Sept. 7, 1954 |

FOREIGN PATENTS

| | | |
|---|---|---|
| 141,439 | Australia | June 4, 1951 |